(12) United States Patent
Shnarch et al.

(10) Patent No.: US 12,093,645 B2
(45) Date of Patent: Sep. 17, 2024

(54) INTER-TRAINING OF PRE-TRAINED TRANSFORMER-BASED LANGUAGE MODELS USING PARTITIONING AND CLASSIFICATION

(71) Applicant: International Business Machines Corporation, Armonk, NY (US)

(72) Inventors: Eyal Shnarch, Tel Aviv (IL); Ariel Gera, Haifa (IL); Alon Halfon, Rishon Lezion (IL); Lena Dankin, Haifa (IL); Leshem Choshen, Haifa (IL); Ranit Aharonov, Ramat Hasharon (IL); Noam Slonim, Beit HaKerem (IL)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 17/474,364

(22) Filed: Sep. 14, 2021

(65) Prior Publication Data

US 2023/0078698 A1 Mar. 16, 2023

(51) Int. Cl.
*G06F 40/279* (2020.01)
*G10L 25/30* (2013.01)

(52) U.S. Cl.
CPC ........... *G06F 40/279* (2020.01); *G10L 25/30* (2013.01)

(58) Field of Classification Search
None
See application file for complete search history.

(56) References Cited

U.S. PATENT DOCUMENTS

2022/0058222 A1* 2/2022 Cheng ................. G06F 16/9027
2022/0414344 A1* 12/2022 Makki Niri ............. G06F 40/30

FOREIGN PATENT DOCUMENTS

CN 110263173 A 9/2019

OTHER PUBLICATIONS

Panda et al. "Unsupervised Sequential Information Bottleneck Clustering For Building Anomaly Based Network Intrusion Detection Model", IICAI-09, 2009. (Year: 2009).*
Zhang et al. "Discovering New Intents with Deep Aligned Clustering", AAAI-21, 35(16), 14365-14373, May 18, 2021 (Year: 2021).*
Aghajanyan et al., "Muppet: Massive Multi-task Representations with Pre-Finetuning", Jan. 26, 2021, 12 pages.
Melamud et al., "Combing Unsupervised Pre-training and Annotator Rationales to Improve Low-shot Text Classification", Proceedings of the 2019 Conference on Empirical Methods in Natural Language Processing and the 9th International Joint Conference on Natural Language Processing, Hong Kong, China, Nov. 3-7, 2019, pp. 3884-3893.

(Continued)

*Primary Examiner* — Nicole A K Schmieder
(74) *Attorney, Agent, or Firm* — Peter J. Edwards (57) ABSTRACT

An example system includes a processor to pre-train a transformer-based language model on a general domain. The processor can inter-train the pre-trained transformer-based language model using partitioning and classification to generate an inter-trained transformer-based pre-trained language model. The processor can then fine-tune the inter-trained transformer-based pre-trained language model on a target task to generate a fine-tuned transformer-based language model.

14 Claims, 8 Drawing Sheets

(56) References Cited

OTHER PUBLICATIONS

Mell, et al., "The NIST Definition of Cloud Computing", National Institute of Standards and Technology, U.S. Department of Commerce, Special Publication 800-145, 7 pages.
Peeters et al., "Intermediate Training of BERT for Product Matching", DI2KG 2020, Aug. 31, Tokyo, Japan, pp. 1-5.
Pruksachatkun, et al., "Intermediate-Task Transfer Learning with Pretrained Models for Natural Language Understanding: When and Why Does It Work?", Proceedings of the 58th Annual Meeting of the Association for Computational Linguistics, Jul. 5-10, 2020, pp. 5231-5247.
Ye et al., "Studying Strategically: Learning to Mask for Closed-book QA", Jan. 1, 2021, 8 pages.
Caron et al., "Deep Clustering for Unsupervised Learning of Visual Features," arXiv:1807.05520v2, Mar. 18, 2019, 30 pages.
Devlin et al., "BERT: Pre-training of Deep Bidirectional Transformers for Language Understanding," arXiv:1810.04805v2, May 24, 2019, 16 pages.
Dodge et al., "Fine-Tuning Pretrained Language Models: Weight Initializations, Data Orders, and Early Stopping," arXiv:2002.06305v1, Feb. 15, 2020, 11 pages.
Shnarch et al., "Cluster & Tune: Enhance BERT Performance in Low Resource Text Classification," ICLR 2021 Conference Blind Submission, Sep. 28, 2020, 18 pages.
Sun et al., "How to Fine-Tune BERT for Text Classification?" arXiv:1905.05583v3, Feb. 5, 2020, 10 pages.
Valipour et al. "Unsupervised Transfer Learning via Bert Neuron Selection," arXiv:1912.05308v1, Dec. 10, 2019, 11 pages.
Whang et al., "Domain Adaptive Training BERT for Response Selection," arXiv:1908.04812v1, Aug. 13, 2019, 8 pages.
Xu et al., Improving BERT Fine-Tuning via Self-Ensemble and Self-Distillation, arXiv:2002.10345v1, Feb. 24, 2020, 7 pages.

\* cited by examiner

INTER-TRAINING OF PRE-TRAINED TRANSFORMER-BASED LANGUAGE MODELS USING PARTITIONING AND CLASSIFICATION

BACKGROUND

The present techniques relate to transformer-based language models. More specifically, the techniques relate to inter-training of pre-trained transformer-based language models.

SUMMARY

According to an embodiment described herein, a system can include processor to pre-train a transformer-based language model on a general domain. The processor can also further inter-train the pre-trained transformer-based language model using partitioning and classification to generate an inter-trained transformer-based pre-trained language model. The processor can also fine-tune the inter-trained transformer-based pre-trained language model on a target task to generate a fine-tuned transformer-based language model.

According to another embodiment described herein, a method can include pre-training, via a processor, a transformer-based language model on a general domain. The method can further include inter-training, via the processor, the pre-trained transformer-based language model using partitioning and classification to generate inter-trained transformer-based language model. The method can also further include fine-tuning, via the processor, the inter-trained transformer-based language model on a target task to generate a fine-tuned transformer-based language model.

According to another embodiment described herein, a computer program product for inter-training transformer-based language models can include computer-readable storage medium having program code embodied therewith. The computer readable storage medium is not a transitory signal per se. The program code executable by a processor to cause the processor to pre-train a transformer-based language model on a general domain. The program code can also cause the processor to inter-train the pre-trained transformer-based language model using partitioning and classification to generate an inter-trained transformer-based pre-trained language model. The program code can also cause the processor to fine-tune the inter-trained transformer-based pre-trained language model on a target task to generate a fine-tuned transformer-based language model.

DETAILED DESCRIPTION

Text classification is a common task within Natural Language Processing (NLP). Applications of text classification include topic detection, sentiment analysis, and text-based filtering, among other examples. Many text classification systems rely on supervised learning, where size and quality of the labeled data strongly impact the performance. Hence, as with many other supervised learning tasks, developing a text classification scheme in practice may involve making the most out of a relatively small set of annotated examples.

Transformer-based pretrained language models such as the Bidirectional Encoder Representations from Transformers (BERT) model, first released in 2018, have led to significant advances in the performance of most NLP tasks, with text classification included. These models typically rely on pre-training a transformer-based neural network on massive and heterogeneous corpora on a general Masked Language Modeling (MLM) task. For example, the MLM task may be predicting a word that is masked in the original text. The obtained model may then be fine-tuned to the actual task of interest, referred to herein as a target task, using the labeled data available for the target task. Thus, pre-trained models may serve as general sentence encoders which can be adapted to a variety of downstream tasks.

However, in some cases, the available labeled data for training such models may be scarce. In many real-world scenarios, obtaining even a couple of hundred of labeled examples may be challenging. It is common for a target class to have a relatively low prior in the examined data, making it a formidable goal to collect enough positive examples for it. Moreover, sometimes data cannot be labeled via crowd-annotation platforms due to confidentiality or because the labeling task requires special expertise. Therefore, in some cases, labeling may be done only by experts with limited availability.

In addition, the number of categories to be considered may be relatively large. For example, the number of categories may be 50 categories, thus making even a modest demand of 200 labeled examples per category a task of labeling 10K instances. Labeling 10,000 cases may be inapplicable in many practical cases. Therefore, in such limited real-world settings, fine-tuning a large pretrained language model often yields far from optimal performance.

To overcome the lack of labeled data, some methods use a gradual approach composed of various phases. For example, some methods further pre-train the model with the self-supervised MLM task over unlabeled data taken from the target task domain. Alternatively, the pretrained model can be trained using a supervised intermediate task, which is different in nature from the target-task, and for which labeled data is more readily available. Each of these methods may provide a better starting point in terms of the model parameters for the final fine-tuning phase, which is then performed over the scarce labeled data available for the target task and aimed to result in improved performance of the resulting model. However, classification tasks are inherently different of the MLM task, thus additional pre-training with the MLM task may be less effective for the classification tasks. Moreover, the alternative of a supervised intermediate task on a different classification task demands finding a task which is relevant for the target task and has available labeled data.

According to embodiments of the present disclosure, a system includes a processor to pre-train a transformer-based language model on a general domain. The processor can inter-train the pre-trained transformer-based language model using partitioning and classification to generate an inter-trained transformer-based pre-trained language model. The processor can then fine-tune the inter-trained transformer-based pre-trained language model on a target task to generate a fine-tuned transformer-based language model. Thus, embodiments of the present disclosure enable unsupervised inter-training of pre-trained transformer-based language models with limited labeled data. Extensive experimental results demonstrate the practical value of this strategy on a variety of benchmark data, most prominently when the training data available for the target task is relatively small and the classification task is of a topical nature. The embodiments described herein require no additional labeled data, and involve an a-priori clustering of training instances that naturally gives rise to an alternative, or additional, inter-training task. Despite their relative simplicity, the embodiments described herein provide a significant boost in classification performance, especially when labeled data for the final fine-tuning is in short supply. In particular, the performance gains of a BERT model inter-trained using clustering over a BERT model trained using MLM shown in experiments suggest that the potential benefits of the embodiments described herein are not limited to merely adapting the model to the characteristics of the target class corpus. Rather, inter-training on top of the clustering appears to carry an additional performance benefit. In addition, for topical datasets in particular, the embeddings obtained for a BERT model inter-trained using clustering techniques described herein induced a much clearer separation between target classes even though no labeled data was used to obtain the model. Moreover, the apparent visual separation resulting from inter-training was aligned with the performance gain obtained later on in the fine-tuning phase over the target task.

Figure 1A:
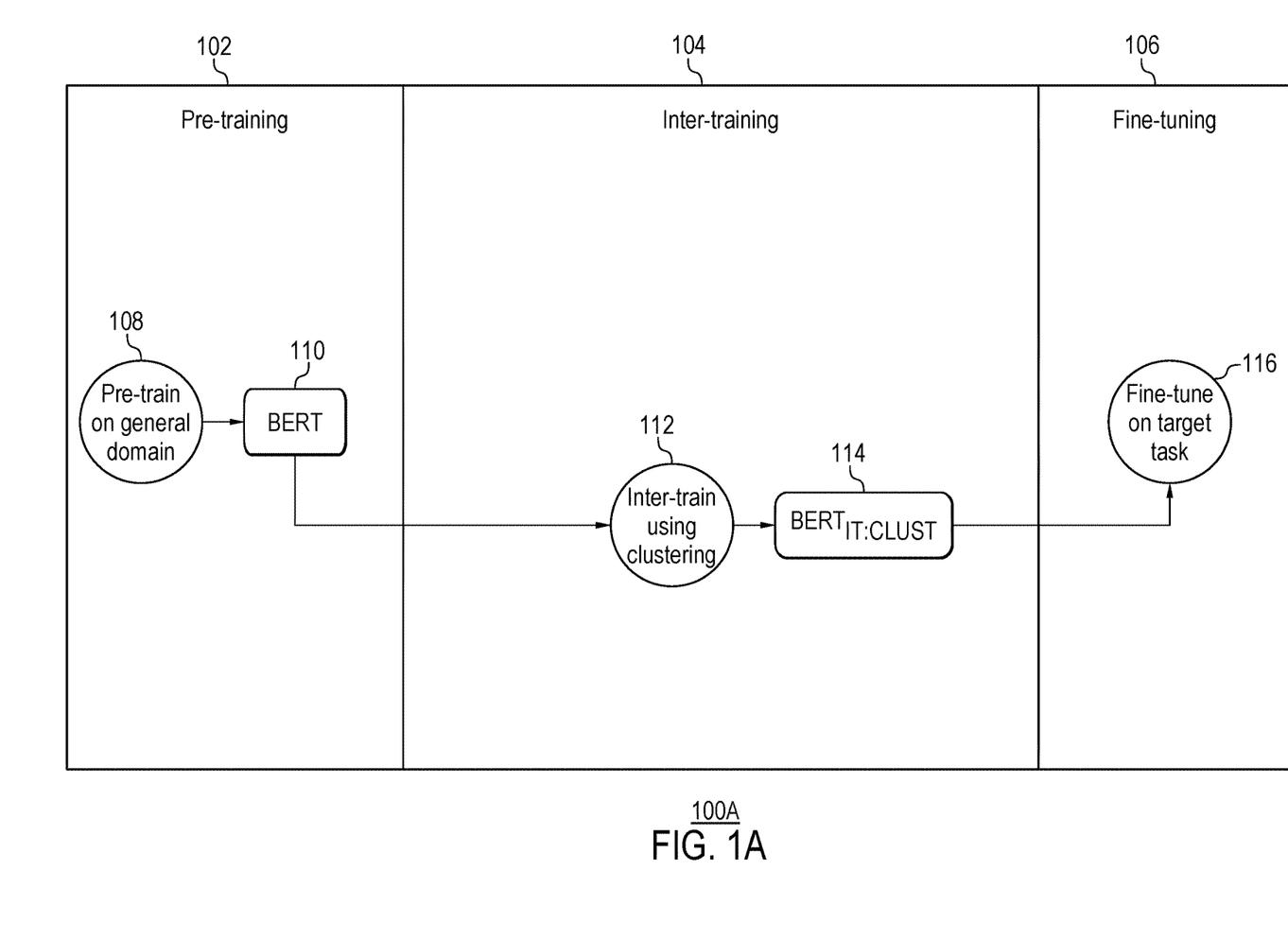
FIG. 1A is a process flow diagram of an example process for inter-training a pre-trained transformer-based language model using partitioning and classification.

With reference now to FIG. 1A, a process flow diagram shows an example process for inter-training a pre-trained transformer-based language model using partitioning and classification. The example system is generally referred to by the reference number 100A. FIG. 1A includes a pre-training stage 102, an inter-training stage 104, and a fine-tuning stage 106.

At block 108, the pre-training stage 102 includes a pre-training on a general domain shown generating a pre-trained BERT model 110. For example, the BERT model 110 may be pretrained over massive general corpora with the MLM task. In various examples, the BERT model 110 may alternatively be any suitable pre-trained transformer-based language model.

In the example of FIG. 1A, at block 112, the inter-training stage 104 includes an inter-training using clustering that generates an inter-trained BERT model 114. For example, an unsupervised clustering may be used for generating pseudo-labels for inter-training. These pseudo-labels can be viewed as weak labels, but are not tailored nor require a specific design per a target task. Instead, generating pseudo-labels may be performed independent of the target classification task. For example, clustering may be performed to partition the training data into $n_c$ clusters. In some examples, the clustering may be performed using k-means clustering. In various examples, the clustering may be performed using sequential Information Bottleneck (sIB) clustering, or any other suitable clustering technique. For example, suitable clustering techniques may include Agglomerative Hierarchical Clustering, Expectation-Maximization Clustering using Gaussian Mixture Models, Latent Dirichlet Allocation (LDA), among other techniques.

In some examples, a Bag of Words (BOW) representations on a stemmed text may be used for clustering. For example, clustering BOW representations may be used for examples trained using topical data. Clustered BOW representations may be used to find a partition that reasonably approximates the true hidden partition according to the (topical) class labels. In some examples, the clustering may be performed over a non-BOW representation. For example, a K-means clustering over BERT classification embeddings using CLS tokens may be used. The CLS embeddings may be low-dimensional, learned continuous vector representation of discrete variables into which text is translated. As one example, the vector representations may be representations of sentences. In other examples, other clustering configurations, such as K-means over Global Vectors for Words (GloVe) representations or Hartigan's K-means over GloVe representations may be used.

In various examples, other types of partitioning other than clustering may be used. For example, a rule-based partitioning may be used. Example rules for a rule-based partitioning may include that all texts including a specific word, or words, or a syntactic structure are to be partitioned into the same group. For example, a syntactic structure may be texts matching a given pattern. In some examples, any suitable similarity-based type partitioning may be used. For example, any suitable clustering algorithm may be used for partitioning.

In various examples, the obtained partitions may then be used as labeled data in a text classification task. For example, the classes may be defined via the $n_c$ clusters. The BERT model 110 may then be inter-trained to predict the cluster label of a particular sample. Similar to MLM, inter-training may use a classifier layer on top of the BERT model 110, which is discarded before the fine-tuning stage. In various examples, the classifier layer may be a multi-class configuration in which the BERT model is trained to predict one out of $n_c$ cluster labels for each single sample received during training. Alternatively, or in addition, in some examples, a binary inter-training task may be used in which the BERT model 110 is trained to determine whether a pair of samples are drawn from the same cluster or not. For example, a pair of training samples may be drawn from either the same or two different partitions, and the BERT model 110 trained to classify the samples accordingly. In this example, the labels used in training may indicate whether the samples came from the same partition or not. In various examples, the inter-training may be performed using a single epoch. The resulting inter-trained model 114 is denoted in FIG. 1A as $BERT_{IT\text{-}CLUST}$.

At block 116, the fine-tuning 106 stage includes a fine-tuning on a target task. For example, the inter-trained model may be fine-tuned in a supervised manner with the available labeled examples for a particular target task at hand. In various examples, the target task may be text classification, key-point analysis, textual entailment, summarization, translation, grammar correction, among other suitable target tasks.

It is to be understood that the block diagram of FIG. 1A is not intended to indicate that the process 100A is to include all of the components shown in FIG. 1A. Rather, the process 100A can include fewer or additional components not illustrated in FIG. 1A (e.g., additional pre-training, inter-training, or fine-tuning, etc.). For example, the inter-training stage 104 and the fine-tuning state 106 may be performed using the adaptive moment estimation (Adam) optimizer for stochastic gradient descent used in training deep learning models. In addition, the BERT model 110 may be alternatively replaced with any suitable pre-trained transformer-based language model.

Figure 1B:
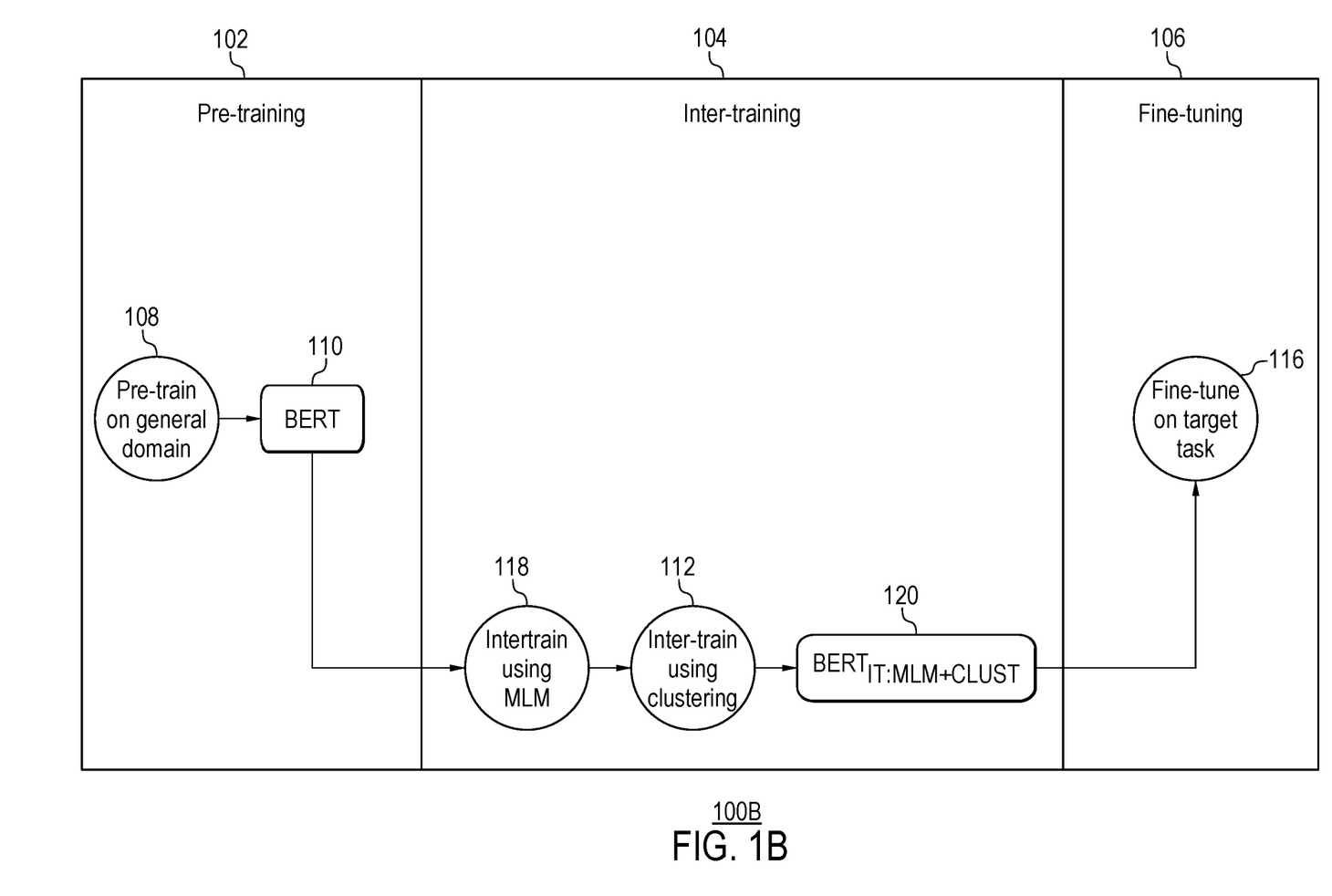
FIG. 1B is a process flow diagram of an example process for inter-training a pre-trained transformer-based language model using partitioning and masked language modeling.

With reference now to FIG. 1B, a process flow diagram shows an example process for inter-training a pre-trained transformer-based language model using partitioning and masked language modeling. The example process is generally referred to by the reference number 100B. FIG. 1B includes similarly referenced elements of FIG. 1A.

At block 118, the BERT model 110 is first inter-trained using a masked language modeling (MLM) task. For example, the BERT model 110 may be inter-trained after the pre-training stage 102, and before any inter-training based on clustering or partitioning.

At block 112, the obtained inter-trained model is further inter-trained to predict the $n_c$ clusters, as described in FIG. 1A. The resulting doubly inter-trained model 120 is denoted in FIG. 1B as $BERT_{IT:MTM+CLUST}$.

At block 116, the doubly inter-trained BERT model $BERT_{IT:MTM+CLUST}$ is fine-tuned on a target task. For example, the BERT model may be trained using any suitable labeled data related to the target task.

It is to be understood that the block diagram of FIG. 1B is not intended to indicate that the process 100B is to include all of the components shown in FIG. 1B. Rather, the process 100B can include fewer or additional components not illustrated in FIG. 1B (e.g., additional pre-training, inter-training, or fine-tuning, etc.). For example, the BERT model 110 may be alternatively replaced with any suitable pre-trained transformer-based language model.

Figure 2:
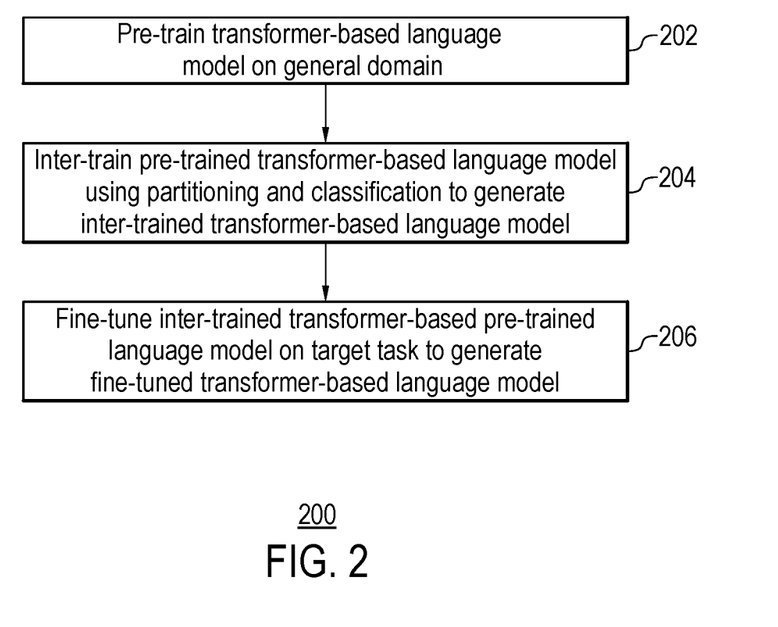
FIG. 2 is a block diagram of an example method that can inter-train a pre-trained transformer-based language model using partitioning and classification.

FIG. 2 is a process flow diagram of an example method that can inter-train a pre-trained transformer-based language model using partitioning and classification. The method 200 can be implemented with any suitable computing device, such as the computing device 400 of FIG. 4 and is described with reference to the process 100A of FIG. 1A. For example, the methods described below can be implemented by the processor 402 or processor 702 of FIGS. 4 and 7.

At block 202, a processor pre-trains a transformer-based language model on a general domain. In various examples, the transformer-based language model may be a BERT model. For example, the processor can pre-train the BERT model using mask language modeling (MLM). The MLM may include predicting one or more words that are masked in an original training text.

At block 204, the processor inter-train the pre-trained transformer-based language model using partitioning and classification to generate an inter-trained transformer-based pre-trained language model. For example, the processor can cluster unlabeled training data and using the clusters as labeled data for an intermediate classification task. In some examples, the processor can sample a pair of training samples from two different partitions and train the pre-trained transformer-based language model to classify the pair differently. In some examples, the processor may sample a pair of training samples from one partition and train the pre-trained transformer-based language model to classify the pair similarly. In various examples, the processor can inter-train the pre-trained transformer-based language model over pseudo-labels generated via an unsupervised sequential Information Bottleneck (sIB) clustering.

At block 206, fine-tune the inter-trained transformer-based pre-trained language model on a target task to generate a fine-tuned transformer-based language model. For example, the processor can fine-tune the inter-trained transformer-based pre-trained language model using any available labeled data suitable for the target task.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 may further include executing the target task on the fine-tuned transformer-based language model.

Figure 3:
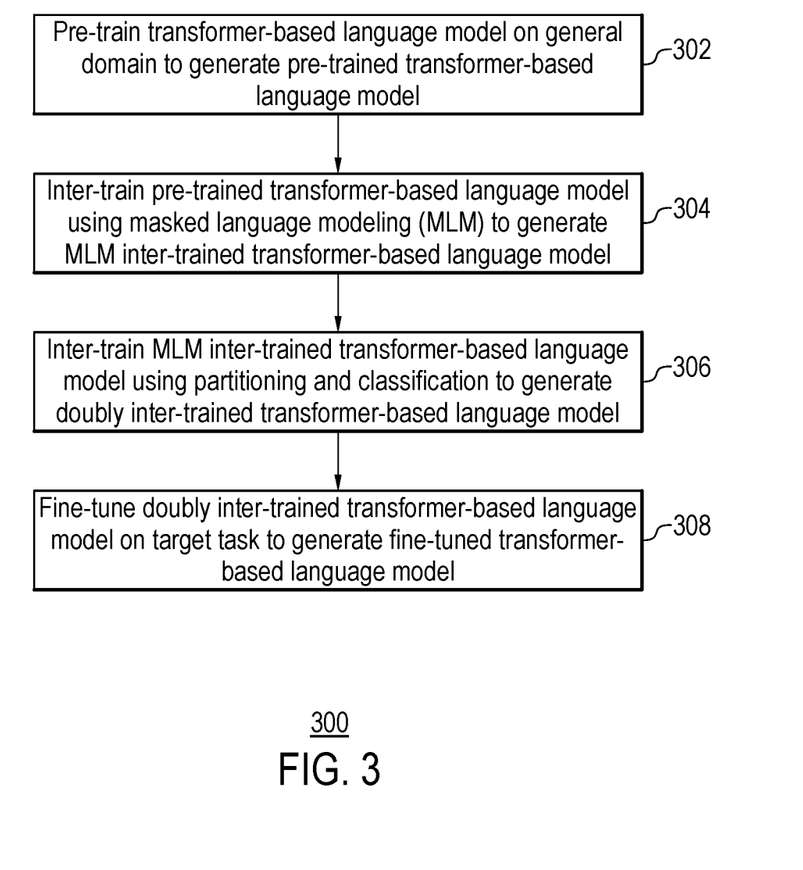
FIG. 3 is a block diagram of an example method that can inter-train a pre-trained transformer-based language model using partitioning and masked language modeling.

FIG. 3 is a process flow diagram of an example method that can inter-train a pre-trained transformer-based language model using partitioning and masked language modeling. The method 300 can be implemented with any suitable computing device, such as the computing device 400 of FIG. 4 and is described with reference to the process 100B of FIG. 1B. For example, the methods described below can be implemented by the processor 402 or processor 702 of FIGS. 4 and 7.

At block 302, a processor pre-trains a transformer-based language model on a general domain to generate pre-trained transformer-based language model. For example, the generated pre-trained transformer-based language model may be a BERT model. In various examples, the transformer-based language model may be pre-trained using mask language modeling (MLM).

At block 304, the processor inter-trains the pre-trained transformer-based language model using masked language modeling (MLM) to generate an MLM inter-trained transformer-based pre-trained language model. For example, the MLM may include predicting one or more words that are masked in an original training text.

At block 306, the processor further inter-trains the MLM inter-trained transformer-based language model using partitioning and classification to generate a doubly inter-trained transformer-based pre-trained language model. For example, the processor can cluster unlabeled training data and using the clusters as labeled data for an intermediate classification task. In some examples, the processor can sample a pair of training samples from two different partitions and train the pre-trained transformer-based language model to classify the pair differently. In some examples, the processor may sample a pair of training samples from one partition and train the pre-trained transformer-based language model to classify the pair similarly. In various examples, the processor can inter-train the pre-trained transformer-based language model over pseudo-labels generated via an unsupervised sequential Information Bottleneck (sIB) clustering.

At block 308, the processor fine-tunes the doubly inter-trained transformer-based pre-trained language model on a target task to generate a fine-tuned transformer-based language model. For example, the processor can fine-tune the doubly inter-trained transformer-based pre-trained language model using any available labeled data suitable for the target task.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may further include executing the target task on the fine-tuned transformer-based language model.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
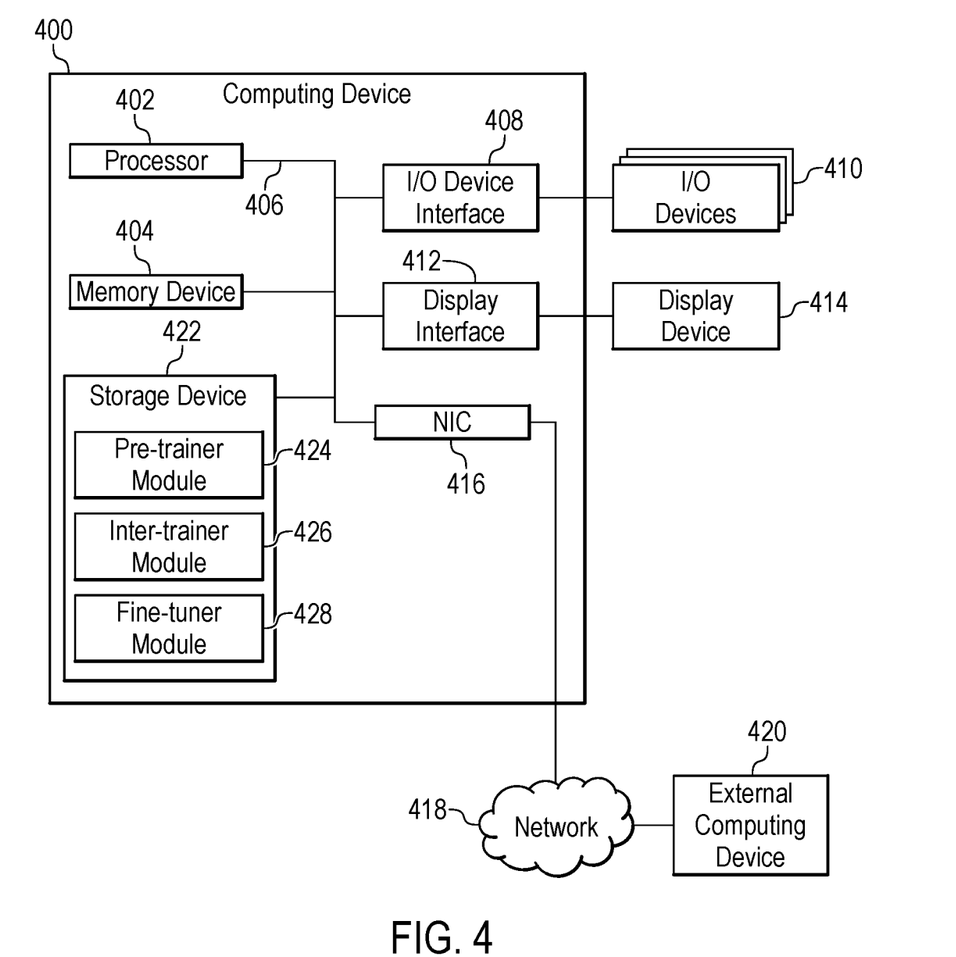
FIG. 4 is a block diagram of an example computing device that can inter-train a pre-trained transformer-based language model using partitioning and classification.

FIG. 4 is block diagram of an example computing device that can inter-train a pre-trained transformer-based language model using partitioning and classification. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a pre-trainer module 424, an inter-trainer module 426, and a fine-tuner module 428. The pre-trainer module 424 can pre-train a transformer-based language model on a general domain. For example, the pre-trainer module 424 can pre-train the transformer-based language model on the general domain using mask language modeling. In various examples, the pre-trained transformer-based language model may be a BERT model. The inter-trainer module 426 can inter-train the pre-trained transformer-based language model using partitioning and classification to generate an inter-trained transformer-based pre-trained language model. For example, the partitioning may include a clustering based on bag of words representations to partition unlabeled training data into clusters of text instances. In various examples, the classification may include an unsupervised classification of training samples into a number of labels corresponding to partitions. In some examples, the classification may be a binary classification in which the pre-trained language model is trained to predict whether a pair of training samples is from the same partition or from a different partition. In some examples, the inter-trainer module 426 can further inter-train the pre-trained transformer-based language model using mask language modeling. The fine-tuner module 428 can fine-tune the inter-trained transformer-based pre-trained language model on a target task to generate a fine-tuned transformer-based language model. For example, the fine-tuner module 428 can fine-tune the inter-trained transformer-based pre-trained language model using available labeled data for the target task.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the pre-trainer 424, the inter-trainer module 426, and the fine-tuner module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the pre-trainer module 424, inter-trainer module 426, and fine-tuner module 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
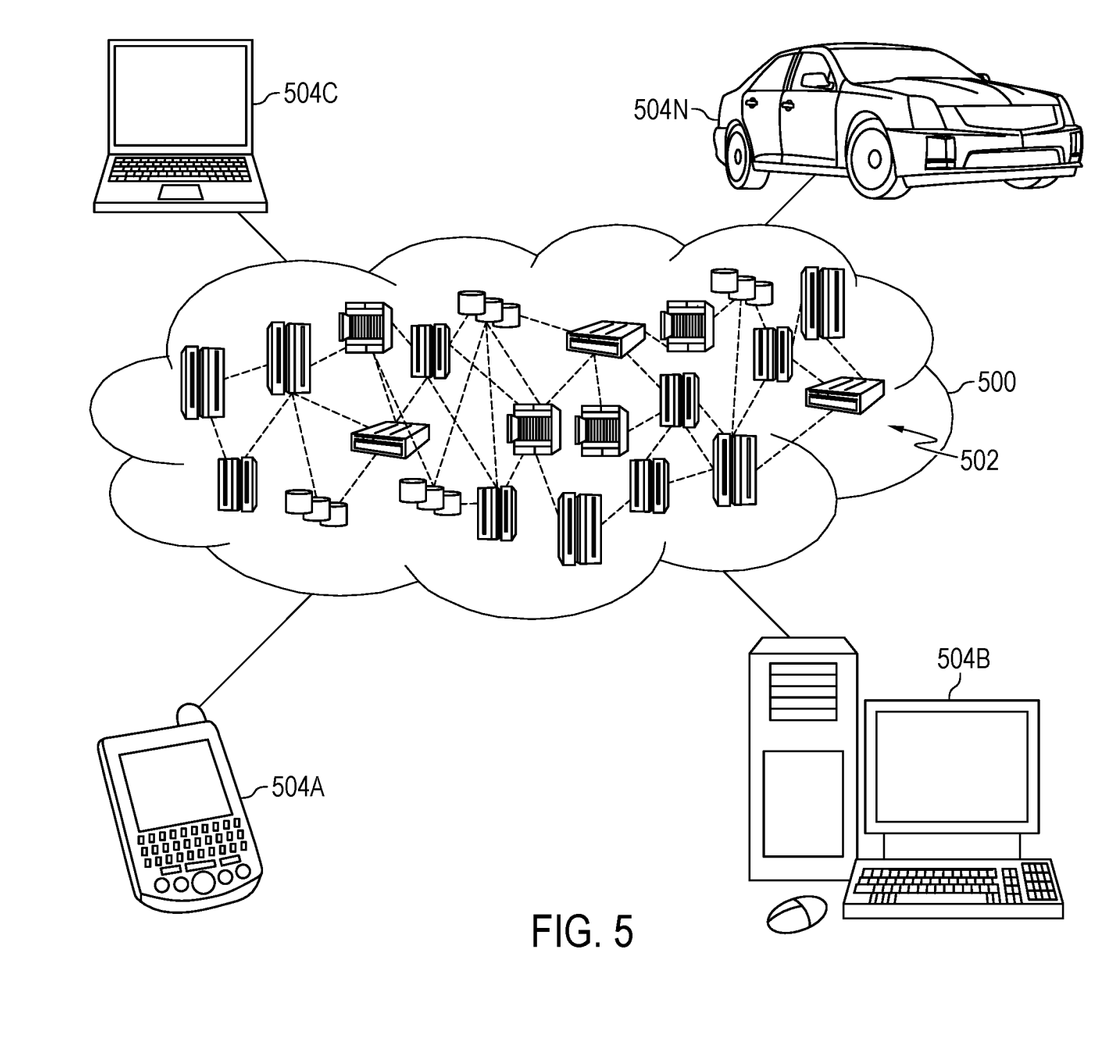
FIG. 5 is a diagram of an example cloud computing environment according to embodiments described herein.

Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
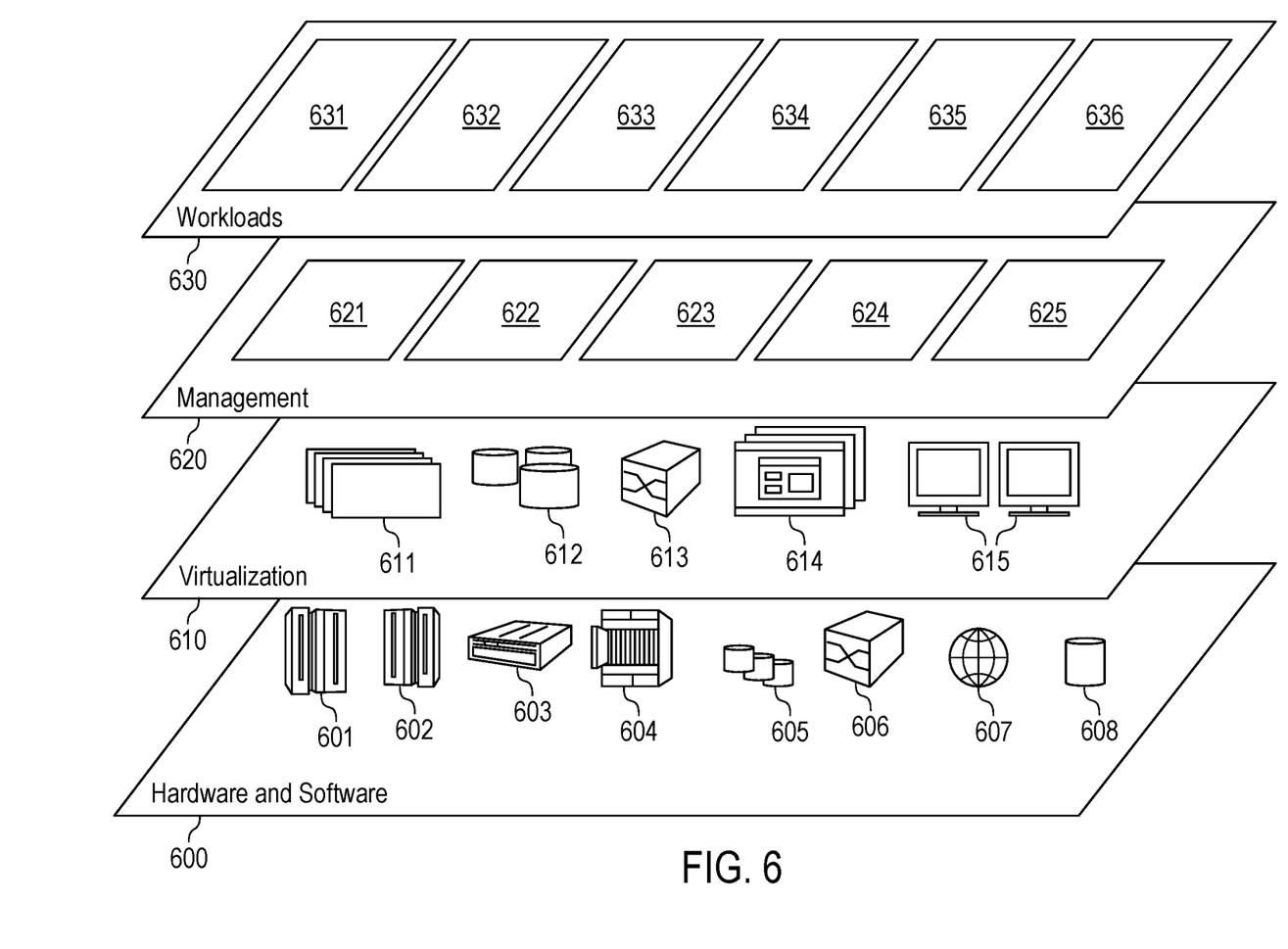
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 610 provides an abstraction layer from which the following examples of virtual entities may be provided: virtual servers 611; virtual storage 612; virtual networks 613, including virtual private networks; virtual applications and operating systems 614; and virtual clients 615.

In one example, management layer 620 may provide the functions described below. Resource provisioning 621 provides dynamic procurement of computing resources and other resources that are utilized to perform tasks within the cloud computing environment. Metering and Pricing 622 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 623 provides access to the cloud computing environment for consumers and system administrators. Service level management 624 provides cloud computing resource allocation and management such that required service levels are met. Service Level Agreement (SLA) planning and fulfillment 625 provide pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation 631; software development and lifecycle management 632; virtual classroom education delivery 633; data analytics processing 634; transaction processing 635; and transformer-based model inter-training 636.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
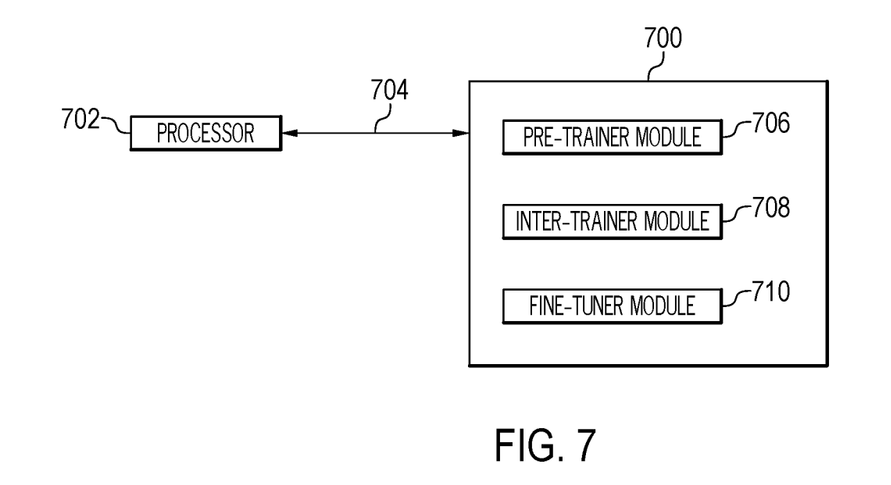
FIG. 7 is an example tangible, non-transitory computer-readable medium that can inter-train a pre-trained transformer-based language model using partitioning and classification.

Referring now to FIG. 7, a block diagram is depicted of an example tangible, non-transitory computer-readable medium 700 that can inter-train a pre-trained transformer-based language model using partitioning and classification. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the methods 200 or 300 of FIGS. 2 and 3.

The various software components discussed herein may be stored on the tangible, non-transitory, computer-readable medium 700, as indicated in FIG. 7. For example, a pre-trainer 706 includes code to pre-train a transformer-based language model on a general domain. The pre-trainer module 706 also includes code to. In some examples, the module 706 includes code to. In some examples, the module 706 includes code to. An inter-trainer module 708 includes code to inter-train the pre-trained transformer-based language model using partitioning and classification to generate an inter-trained transformer-based pre-trained language model. In some examples, the inter-trainer module 708 further includes code to inter-train the pre-trained transformer-based language model using mask language modeling. The inter-trainer module 708 also includes code to. In some examples, the inter-trainer module 708 further includes code to cluster unlabeled training data and use the clusters as labeled data for an intermediate classification task. In some examples, the inter-trainer module 708 further includes code to sample a pair of training samples and inter-train the pre-trained transformer-based language model to classify the pair as belonging to a same partition or a different partition. In various examples, the inter-trainer module 708 further includes code to inter-train the pre-trained transformer-based language model over pseudo-labels generated via unsupervised sequential Information Bottleneck (sIB) clustering. A fine-tuner module 710 includes code to fine-tune the inter-trained transformer-based pre-trained language model on a target task to generate a fine-tuned transformer-based language model. For example, the fine-tuner module 710 may include code to fine-tune the inter-trained transformer-based pre-trained language model using available labeled data for the target task.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application. For example, the computer-readable medium 700 may also include code to execute the target task on the fine-tuned transformer-based language model. In various examples, the target task may be text classification, key-point analysis, or textual entailment, among other target tasks.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   pre-train a transformer-based language model on a general domain;
   inter-train the pre-trained transformer-based language model using mask language modeling to generate a mask language modeling (MLM) inter-trained transformer-based pre-trained language model;
   inter-train the MLM inter-trained transformer-based pre-trained language model using partitioning and classification to generate a doubly inter-trained transformer-based pre-trained language model, wherein the partitioning comprises a clustering based on bag of words representations on a stemmed text to partition, according to class labels, unlabeled training data into clusters of text instances and wherein the inter-training the MLM inter-trained transformer-based pre-trained language model comprises using the clusters of text instances as labeled data for an intermediate training task; and
   fine-tune the doubly inter-trained transformer-based pre-trained language model on a target task to generate a fine-tuned transformer-based language model.

2. The system of claim 1, wherein the classification comprises an unsupervised classification of training samples into a plurality of labels corresponding to partitions.

3. The system of claim 1, wherein the classification comprises a binary classification in which the MLM inter-trained transformer-based pre-trained language model is trained to predict whether a pair of training samples is from a same partition or from a different partition.

4. The system of claim 1, wherein the processor is to pre-train the transformer-based language model on the general domain using mask language modeling.

5. The system of claim 1, wherein the pre-trained transformer-based language model comprises a Bidirectional Encoder Representations from Transformers (BERT) model.

6. A computer-implemented method, comprising:
   pre-training, via a processor, a transformer-based language model on a general domain;
   inter-training the pre-trained transformer-based language model using mask language modeling to generate a mask language modeling (MLM) inter-trained transformer-based pre-trained language model;
   inter-training, via the processor, the MLM inter-trained transformer-based pre-trained language model using partitioning and classification to generate a doubly inter-trained transformer-based language model, wherein the partitioning comprises a clustering based on bag of words representations on a stemmed text to partition, according to class labels, unlabeled training data into clusters of text instances and wherein the inter-training the MLM inter-trained transformer-based pre-trained language model comprises using the clusters of text instances as labeled data for an intermediate training task; and fine-tuning, via the processor, the doubly inter-trained transformer-based language model on a target task to generate a fine-tuned transformer-based language model.

7. The computer-implemented method of claim 6, wherein the inter-training the MLM inter-trained transformer-based pre-trained language model comprises sampling a pair of training samples from two different partitions and training the MLM inter-trained transformer-based pre-trained language model to classify the pair of training samples differently.

8. The computer-implemented method of claim 6, wherein the inter-training the MLM inter-trained transformer-based pre-trained language model comprises sampling a pair of training samples from one partition and training the MLM inter-trained transformer-based pre-trained language model to classify the pair of training samples similarly.

9. The computer-implemented method of claim 6, wherein the inter-training the MLM inter-trained transformer-based pre-trained language model comprises inter-training the MLM inter-trained transformer-based pre-trained language model over pseudo-labels generated via an unsupervised sequential Information Bottleneck (sIB) clustering.

10. The computer-implemented method of claim 6, comprising executing, via the processor, the target task on the fine-tuned transformer-based language model.

11. A computer program product for inter-training transformer-based language models, the computer program product comprising a computer-readable storage medium having program code embodied therewith, wherein the computer-readable storage medium is not a transitory signal per se, the program code executable by a processor to cause the processor to:

pre-train a transformer-based language model on a general domain;

inter-train the pre-trained transformer-based language model using mask language modeling to generate a mask language modeling (MLM) inter-trained transformer-based pre-trained language model;

inter-train the MLM inter-trained transformer-based pre-trained language model using partitioning and classification to generate a doubly inter-trained transformer-based pre-trained language model, wherein the partitioning comprises a clustering based on bag of words representations on a stemmed text to partition, according to class labels, unlabeled training data into clusters of text instances and wherein the inter-training the MLM inter-trained transformer-based pre-trained language model comprises using the clusters of text instances as labeled data for an intermediate training task; and fine-tune the doubly inter-trained transformer-based pre-trained language model on a target task to generate a fine-tuned transformer-based language model.

12. The computer program product of claim 11, further comprising program code executable by the processor to sample a pair of training samples and inter-train the MLM inter-trained transformer-based pre-trained language model to classify the pair of training samples as belonging to a same partition or a different partition.

13. The computer program product of claim 11, further comprising program code executable by the processor to inter-train the MLM inter-trained transformer-based pre-trained language model over pseudo-labels generated via unsupervised sequential Information Bottleneck (sIB) clustering.

14. The computer program product of claim 11, further comprising program code executable by the processor to execute the target task on the fine-tuned transformer-based language model.

* * * * *